US008328974B2

(12) United States Patent
Tokunaga et al.

(10) Patent No.: US 8,328,974 B2
(45) Date of Patent: Dec. 11, 2012

(54) FILM STICKING APPARATUS AND FILM STICKING METHOD

(75) Inventors: Takeshi Tokunaga, Nagoya (JP); Koichi Miyashita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 434 days.

(21) Appl. No.: 12/573,318

(22) Filed: Oct. 5, 2009

(65) Prior Publication Data

US 2010/0108242 A1 May 6, 2010

(30) Foreign Application Priority Data

Oct. 31, 2008 (JP) ................................ 2008-281333

(51) Int. Cl.
*B29C 53/08* (2006.01)

(52) U.S. Cl. ......................... 156/215; 156/475; 156/196

(58) Field of Classification Search .................. 493/395; 53/287, 441, 442; 156/293, 115, 215, 475, 156/213, 216, 196, 212, 477.1, 485; *B29C 53/08*
See application file for complete search history.

(56) References Cited

U.S. PATENT DOCUMENTS

| | | | | |
|---|---|---|---|---|
| 4,557,773 | A * | 12/1985 | Bonzo | 156/64 |
| 2006/0213164 | A1 | 9/2006 | Hatano et al. | |
| 2007/0169894 | A1 | 7/2007 | Enomoto et al. | |
| 2009/0020918 | A1 * | 1/2009 | Shoji et al. | 264/400 |

FOREIGN PATENT DOCUMENTS

| | | |
|---|---|---|
| JP | U-58-059701 | 4/1983 |
| JP | A-2005-254301 | 9/2005 |
| JP | A-2006-297900 | 11/2006 |

OTHER PUBLICATIONS

Japanese Office Action in Japanese Patent Application No. 2008-281333; dated Dec. 21, 2010 (w/ English-language translation).

* cited by examiner

*Primary Examiner* — Khanh P Nguyen
*Assistant Examiner* — Vishal I Patel
(74) *Attorney, Agent, or Firm* — Oliff & Berridge, PLC

(57) ABSTRACT

The film sticking apparatus includes: a gripping member; a pressing member pressing the adhesive face of the film being held in a planar state against one end face of a cylindrical honeycomb structure having a plurality of cells, and thus sticking the film to the one end face; and a folding member having an opening portion formed that allows an end of the honeycomb structure on the side to which the film is stuck to be inserted, wherein the folding member folds a protruding portion of the film protruding from the one end face of the honeycomb structure by inserting the honeycomb structure into the opening portion, toward a side face of the honeycomb structure, and simultaneously presses at least a part of the folded protruding portion against a part of the side face of the honeycomb structure to stick the film to the side face.

8 Claims, 5 Drawing Sheets

FILM STICKING APPARATUS AND FILM STICKING METHOD

FIELD OF THE INVENTION

The present invention relates to a film sticking apparatus and a film sticking method, and specifically to a film sticking apparatus and a film sticking method capable of automatically sticking a film to a honeycomb structure.

BACKGROUND OF THE INVENTION

Exhaust gas discharged from internal combustion engine such as diesel engine contains large amounts of particulates (particulate matter) containing carbon as the main component acting as a cause of environmental pollution. Accordingly the exhaust system of diesel engine and the like is ordinarily provided with a filter to collect the particulates.

For example, as illustrated in FIG. 10, that type of filter adopts a plugged honeycomb structure 150. The plugged honeycomb structure 150 includes: a honeycomb structure 50 having porous partition walls 52 that partition and form a plurality of cells 51; and plugging sections 53 being arranged to plug one end of the two open end sections of each cell 51, and the plugging sections 53 are arranged in a complementary checkered pattern on each of one end face side and the other end face side of the honeycomb structure 50.

As the method for manufacturing the plugged honeycomb structure, there is a known method in which after a film having an adhesive face (hereinafter the film is also referred to as a "mask") is stuck to one end face of a non-fired honeycomb structure, and a hole is opened at a portion of the mask covering the cell in which the plugging section is to be arranged, using laser machining utilizing an image processing, or the like, an end portion to which the mask is stuck is immersed in a slurry for plugging, the slurry for plugging is filled and dried in the end portion of the cell, the mask stuck to the end face is peeled, and then the honeycomb structure is fired. (For example, refer to Patent Document 1.)

[Patent Document 1] JP-A 2006-297900

DISCLOSURE OF THE INVENTION

Problems to be Solved by the Invention

The manufacturing method described in Patent Document 1 includes the step of sticking a film to one end face and to a part of side face of a honeycomb structure by hand. The sticking job, however, may generate wrinkle or slack of the stuck film unless the job is done by a skilled worker. Once that wrinkle and slack occurred, good formation of the plugging section becomes difficult in some cases. Furthermore, even a skilled worker takes a time in film-sticking job.

The present invention has been developed to solve the above-described problems in the related art, and an issue of the present invention is to provide a film sticking apparatus and a film sticking method capable of automatically sticking a film to a honeycomb structure.

Means to Solve the Problems

The present invention provides a film sticking apparatus and a film sticking method to be described below.

[1] A film sticking apparatus comprising: a gripping member gripping a film having an adhesive face to hold the film in a planar state; a pressing member pressing the adhesive face of the film being held in a planar state against one end face of a cylindrical honeycomb structure having a plurality of cells formed that communicate between two end faces thereof, and thus sticking the film to the one end face; and a folding member having an opening portion formed that allows an end of the honeycomb structure on the side to which the film is stuck to be inserted, a hardness of the folding member having 10 degrees at the lower limit and 60 degrees at the upper limit, wherein the folding member folds a protruding portion of the film protruding from the one end face of the honeycomb structure by inserting the honeycomb structure into the opening portion, toward a side face of the honeycomb structure, and simultaneously presses at least a part of the folded protruding portion against a part of the side face of the honeycomb structure to stick the film to the side face.

[2] The film sticking apparatus according to [1], wherein the folding member is made of urethane resin, silicon resin, or polyethylene resin.

[3] The film sticking apparatus according to [1] or [2], wherein the shape of the open edge of the opening portion is in circular shape, elliptical shape, oval shape, or quadrangular shape.

[4] The film sticking apparatus according to any of [1] to [3], wherein the diameter of the opening portion is uniform toward inward thereof.

[5] The film sticking apparatus according to any of [1] to [4], wherein the pressing member is in a cylindrical shape rotatable around the central axis in the longitudinal direction thereof, and is positioned so that the central axis in the longitudinal direction may become in parallel with the film being held in a planar state.

[6] The film sticking apparatus according to any of [1] to [5], wherein the material of the pressing member is made of urethane resin, silicon resin, or polyethylene resin.

[7] The film sticking apparatus according to any of [1] to [6], further comprising a transfer bed for transferring the honeycomb structure to a specified position.

[8] A film sticking method for sticking a film to a honeycomb structure using the film sticking apparatus according to any of [1] to [7], comprising the steps of: gripping a film to hold the film in a planar state with the gripping member; positioning the honeycomb structure so that the adhesive face of the film being held in a planar state may face the one end face of the honeycomb structure; sticking the film to the one end face by pressing the adhesive face of the film against the one end face of the honeycomb structure with the pressing member; and folding a protruding portion of the film toward a side face of the honeycomb structure by inserting the honeycomb structure into the opening portion of the folding member, and simultaneously pressing at least a part of the folded protruding portion against a part of the side face of the honeycomb structure.

[9] The film sticking method according to [8], wherein an open edge of the opening portion and an outer peripheral edge of the end face of the honeycomb structure are in the same shape or in a similar shape with each other, and the ratio of the diameter of the open edge to the outer diameter of the end face of the honeycomb structure is 80% at the lower limit and 105% at the upper limit.

[10] The film sticking method according to [8] or [9], wherein, when the honeycomb structure is inserted into the opening portion of the folding member, the honeycomb structure is positioned, relative to the folding member, so that the whole area of outer peripheral edge of the end face may contact with the face of the folding member on the side into which the honeycomb structure is inserted.

[11] The film sticking method according to any of [8] to [10], wherein the pressing member is in a cylindrical shape rotatable around the central axis in the longitudinal direction thereof, and is positioned so that the central axis in the longitudinal direction may become orthogonal to the central axis in the longitudinal direction of the honeycomb structure, and wherein the pressing member travels in parallel with the end face at a speed ranging from 30 to 800 mm/sec while rotating, thus pressing the film against the end face with the outer peripheral face of the pressing member.

Effect of the Invention

The film sticking apparatus according to the present invention provides an effect of capable of automatically sticking a film to a honeycomb structure.

The film sticking method according to the present invention provides an effect of capable of automatically sticking a film to a honeycomb structure.

BEST MODE FOR CARRYING OUT THE INVENTION

The best mode for carrying out the present invention will be described below. The present invention, however, is not limited to the following-given embodiments, and it should be understood that the present invention covers the ones adequately revised or improved, and other modification thereof based on the knowledge of person skilled in the art within a range not to depart from the spirit and scope of the present invention.

[1] Film Sticking Apparatus

Figure 1:
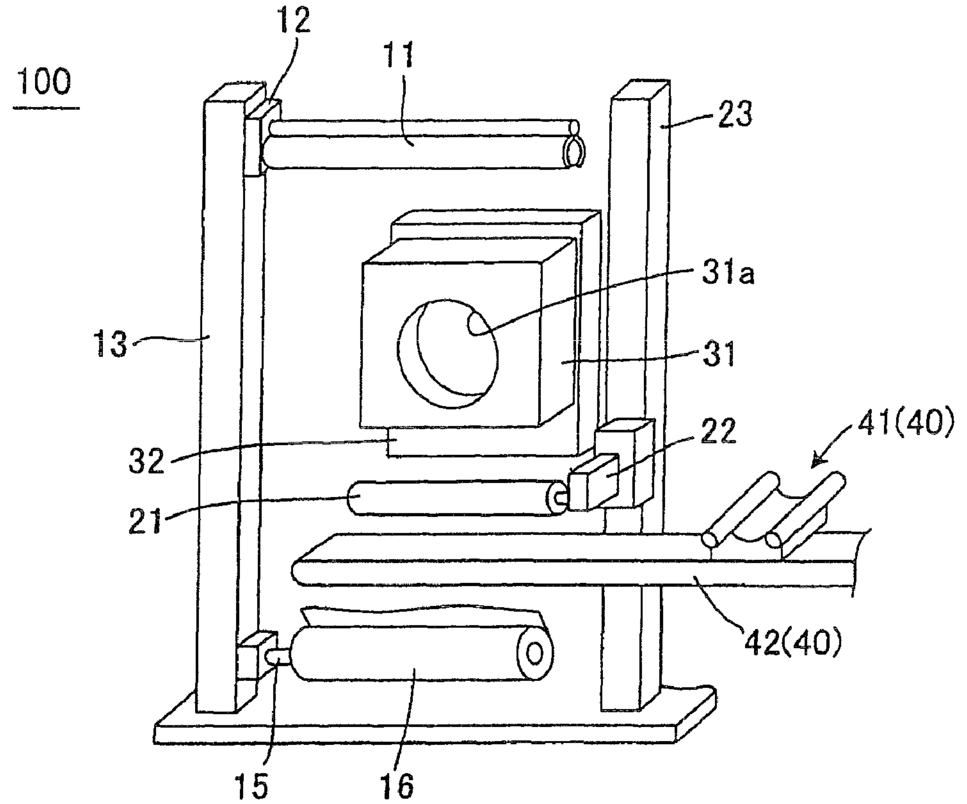
FIG. 1 is a schematic perspective view of an embodiment of a film sticking apparatus according to the present invention.

FIG. 1 is a schematic perspective view of an embodiment of the film sticking apparatus according to the present invention. As illustrated in FIG. 1, a film sticking apparatus 100 of the embodiment includes: a gripping member 11 gripping a film having an adhesive face to hold the film in a planar state; a pressing member 21 pressing the adhesive face of the film being held in a planar state against one end face of a cylindrical honeycomb structure having a plurality of cells formed that communicate between two end faces thereof, and thus sticking the film to the one end face; a folding member 31 having an opening portion 31*a* formed that allows an end of the honeycomb structure on the side to which the film is stuck to be inserted, a hardness of the folding member having 10 degrees at the lower limit and 60 degrees at the upper limit; and a transfer bed 40 for transferring the honeycomb structure to a specified position. The folding member 31 folds a protruding portion of the film protruding from the one end face of the honeycomb structure by inserting the honeycomb structure into the opening portion 31*a*, toward a side face of the honeycomb structure, and simultaneously presses at least a part of the folded protruding portion against a part of the side face of the honeycomb structure to stick the film to the side face. With the configuration, the film sticking apparatus 100 according to the embodiment can automatically stick the film to the honeycomb structure.

Figure 2:
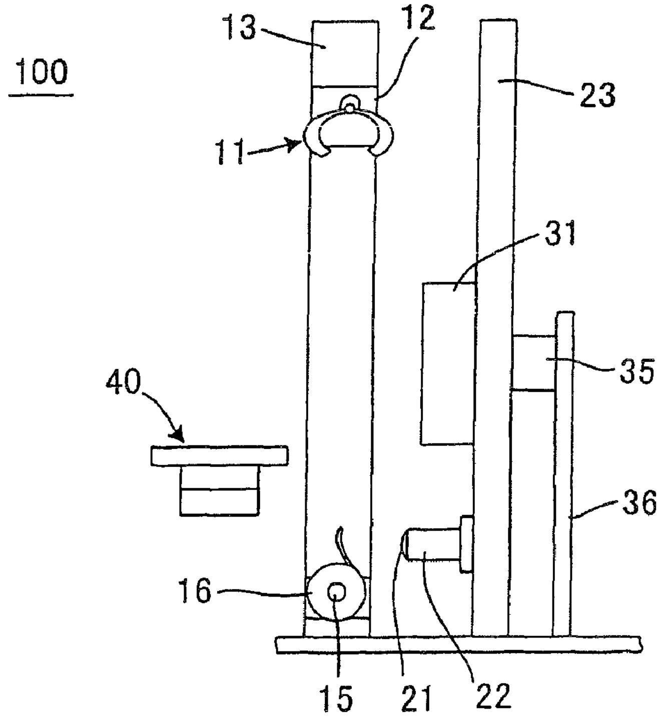
FIG. 2 illustrates a side view of the film sticking apparatus given in FIG. 1.

FIG. 2 illustrates a side view of the film sticking apparatus 100 given in FIG. 1. As illustrated in FIG. 2, the film sticking apparatus 100 is configured by arranging the members sequentially beginning from the transfer bed 40 side, the gripping member 11, the pressing member 21, and the folding member 31.

[1-1] Gripping Member

The gripping member attached to the film sticking apparatus of the embodiment grips a film having an adhesive face to hold the film in a planar state. Since that type of gripping member holds the film in a planar state, the film can be stuck to an end face of the honeycomb structure without generating wrinkle and slack.

The gripping member 11 of the film sticking apparatus 100 illustrated in FIG. 1 has a pair of claws, each having a semi-cylindrical shape, thus giving approximately a cylindrical shape as a whole. The film sticking apparatus 100 shown in FIG. 1 has a driving mechanism 12 opening/closing the pair of claws of the gripping member 11, a first support pillar 13 equipped with the driving mechanism 12 which can move up and down, a support rod 15 being fixed at a lower part of the first support pillar 13 and positioned so that the longitudinal central axis thereof may become in parallel with the longitudinal central axis of the gripping member 11, and a cut-out member (not shown) for cutting the film. The support rod 15 is provided with a cylindrical film roll 16. The film roll 16 is formed by taking up a film 16*a* having an adhesive face.

The gripping member is not specifically limited in the configuration as far as the member can grip and draw one end of the film, and can use the one made of resin, metal, and the like. The pair of claws of the gripping member may be in pipe shape having a cross sectional shape of rectangular, elliptical, polygonal, and the like. The gripping member is not limited to the one having a pair of claws, and the one having bar-shape can be used.

Although the material of the film is not specifically limited, polyester resin, polypropylene resin, and vinyl chloride resin are preferred. Those resins provide good masking on the end face and on the side face of the honeycomb structure. Preferred material, (adhesive), for forming the adhesive face includes an acrylic-base adhesive, a rubber-base adhesive, and a silicon-base adhesive.

Regarding the thickness of the film, the lower limit is preferably 5 μm, and more preferably 12 μm. The upper limit thereof is preferably 100 μm, and more preferably 50 μm. If the thickness is smaller than 5 μm, there is a possibility of difficulty in sticking a film to the honeycomb structure without generating wrinkle and slack. On the other hand, if the thickness exceeds 100 μm, the film supporting strength increases, resulting in difficulty in sticking a film to the honeycomb structure in some cases.

[1-2] Pressing Member

The pressing member of the film sticking apparatus in the embodiment is the one to press the adhesive face of the film held in a planar state against one end face of the columnar honeycomb structure having a plurality of cells formed that communicate between two end faces thereof, from the non-adhesive face side, thus sticking the film to the one end face thereof. That type of pressing member enables the film to stick to the end face of the honeycomb structure without generating wrinkle and slack.

As described above, the pressing member has no specific limitation in the shape and the like if only the pressing member can press the film against one end face of the honeycomb structure, and can stick the film to the one end face thereof. For example, the pressing member may have larger area or smaller area than the area of the end face of the honeycomb structure.

Furthermore, the method for pressing the film against the end face has no specific limitation. For example, a pressing member having larger area than the area of the end face of the honeycomb structure can be used to stick the film in one shot. Alternatively, sticking may proceed beginning from an edge of one end face gradually. The pressing member used in the method of sticking the film beginning from an edge of one end face gradually can adopt, for example, the one in plate shape, cylindrical shape, elliptical prism shape, quadrangular prism shape, and polygonal prism shape. Among these, preferable one is cylindrical shape rotatably supported around the longitudinal central axis, being positioned so that the longitudinal central axis thereof may become in parallel with the film held in a planar state. That type of pressing member enables the film to be stuck to one end face of the honeycomb structure in good condition without generating wrinkle and slack.

When the cylindrical pressing member is used, the member may not be a rotatable one. The rotatable member, however, provides better sticking of the film to an end face of the honeycomb structure because the friction generated between the pressing member and the film decreases on pressing the film against the end face.

Figure 5:
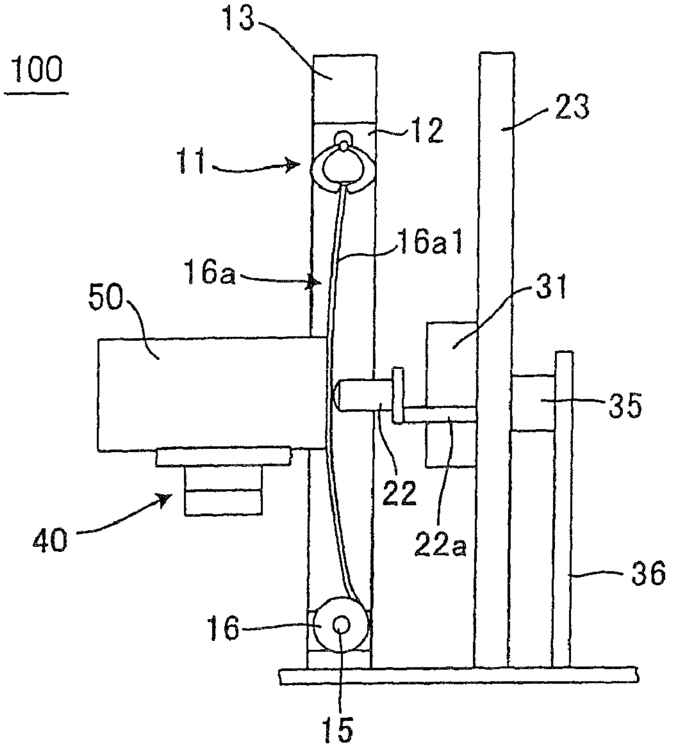
FIG. 5 illustrates a side view of the film sticking apparatus given in FIG. 1, in an operating state.

The pressing member 21 of the film sticking apparatus 100 illustrated in FIG. 1 is in cylindrical shape rotatably supported around the longitudinal central axis, and being positioned so that the longitudinal central axis thereof may become in parallel with the film held in a planar state. The film sticking apparatus 100 illustrated in FIG. 1 has a lift mechanism 22 supporting the pressing member 21, and a second support pillar 23 equipped with the lift mechanism 22 which can move up and down. The lift mechanism 22 has a projection arm 22*a*. The projection arm 22*a* allows the lift mechanism 22 to protrude in the direction orthogonal to the second support pillar 23. FIG. 5 illustrates the state that the lift mechanism 22 protrudes, by the action of the projection arm 22*a*, in the direction orthogonal to the second support pillar 23.

Although the material of the pressing member is not specifically limited, urethane resin, silicon resin, and polyethylene resin are preferred. Those kinds of materials enable the film to be stuck to one end face of the honeycomb structure in better condition without generating wrinkle and slack.

As for the hardness of the pressing member, the lower limit is preferably 30 degrees, more preferably 40 degrees, and most preferably 45 degrees. The upper limit thereof is preferably 90 degrees, more preferably 85 degrees, and most preferably 80 degrees. If the hardness is smaller than 30 degrees, there may occur difficulty in sticking film to the end face without generating wrinkle and slack. If the hardness exceeds 90 degrees, the film may be broken. The term "hardness" referred to herein is the value determined by an ASKER rubber durometer having a needle, in circular truncated cone shape with 2.5 mm in height, directly impinging vertically on a flat face of the pressing member or the folding member.

When a cylindrical pressing member is used, the size can arbitrarily be selected. Specifically, however, the lower limit of the diameter is preferably 10 mm, more preferably 15 mm, and most preferably 20 mm. The upper limit thereof is preferably 50 mm, more preferably 40 mm, and most preferably 35 mm. As for the length of the cylindrical pressing member, the lower limit is preferably 50 mm, more preferably 100 mm, and most preferably 150 mm. The upper limit thereof is preferably 1000 mm, more preferably 900 mm, and most preferably 850 mm.

For example, the honeycomb structure has porous partition walls that partition and form a plurality of cells. That type of honeycomb structure can be manufactured by kneading a ceramic powder such as silicon carbide, cordierite, cordierite-forming raw material, and aluminum titanate-forming raw material, with an organic binder, water, and the like to form a clay-like kneaded puddle, and then the kneaded puddle is formed into a honeycomb shape using an extruder or the like, followed by drying the honeycomb shape. The term "cordierite-forming raw material" referred to herein signifies a mixed material of silica ($SiO_2$) by 42% to 56% by mass, alumina ($Al_2O_3$) by 30% to 45% by mass, and magnesia (MgO) by 12% to 16% by mass, the mixture being fired to form the cordierite.

[1-3] Folding Member

The folding member of the film sticking apparatus of the embodiment has an opening portion formed that allows an end portion of the honeycomb structure on the side to which the film is stuck to be inserted, and has the hardness of 10 degrees as the lower limit, and 60 degrees as the upper limit. By the insertion of the honeycomb structure into the opening portion, the folding member folds the protruding portion of the film protruded from one end face of the honeycomb structure toward a side face of the honeycomb structure, and simultaneously presses at least a part of the folded protruding portion against a part of the side face of the honeycomb structure to stick the film to the side face.

With that type of folding member, the film stuck to the side face of the honeycomb structure has an advantage of not generating wrinkle and slack. In addition, when the folding member sticks the film to the side face of the honeycomb structure, the honeycomb structure is protected. That is, even when the honeycomb structure is subjected to impact at the side face, the honeycomb structure has an advantage to be not easily broken. Furthermore, in the step of forming the plugging section to plug the cell, there is an advantage that, when immersing the honeycomb structure in the slurry for plugging thereof and introducing the slurry under pressure into the cell, the honeycomb structure can be easily immersed in the slurry and easily accept the introduction of the slurry into the cell under pressure.

The folding member is preferably made of urethane resin, silicon resin, or polyethylene resin. Among these, the one made of urethane resin is preferred. The folding member made of urethane resin has an advantage of obtaining good sticking performance because the surface of the urethane resin is adequately deformed by the honeycomb structure.

The hardness of the folding member is required to be 10 degrees as the lower limit, preferably 15 degrees, and more preferably 20 degrees. The upper limit thereof is necessary to be 60 degrees, preferably 50 degrees, and more preferably 45 degrees. If the hardness thereof is smaller than 10 degrees, the sufficient stickiness of the film to the side face of the honeycomb structure becomes difficult to obtain. If the hardness thereof exceeds 60 degrees, the film is broken when the honeycomb structure is pushed into the opening portion.

The shape of the folding member can be in a shape of, for example, cylinder, elliptic prism, quadrangular prism, polygonal prism, and cone. When a folding member in quadrangular prism shape is used, for example, the lower limit of the thickness in the longitudinal direction is preferably 30 mm, and more preferably 40 mm. The upper limit thereof is preferably 150 mm, and more preferably 100 mm. Of both end faces in the longitudinal direction, the face that can be contacted with the honeycomb structure preferably has the lower limit of 20 mm as the minimum distance between the outer periphery thereof and the open edge of the opening portion, and more preferably 50 mm. The upper limit thereof is preferably 200 mm.

Although the opening portion may be a space in any shape if only the portion accepts the insertion of the honeycomb structure, the shape of the open edge preferably has the same shape or a similar shape with the shape of the end face of the honeycomb structure. Specifically, the shape is preferably in circular shape, elliptical shape, oval shape, or quadrangular shape. For example, when a honeycomb structure in cylindrical shape is used, (that is, when the shape of the end face of the honeycomb structure is circular shape), a circular shape of the open edge of the opening portion enables the film to be stuck to a part of the side face in better condition.

The folding member 31 of the film sticking apparatus 100 illustrated in FIG. 1 has the opening portion 31*a* formed, which has circular shape of the open edge and allows a honeycomb structure 50 to be inserted thereinto. The film sticking apparatus 100 illustrated in FIG. 1 is provided with a fixing plate 32 that fixes the folding member 31 and has a penetration hole formed that has a similar opening diameter with that of the folding member 31, a driving cylinder 35 connected to the fixing plate 32, and a third support pillar 36 supporting the driving cylinder 35. The driving cylinder 35 contains a shaft 37 therein. When the shaft 37 is taken out, the fixing plate 32, or the folding member 31, can be pushed outward.

Furthermore, the opening diameter of the opening portion is preferably in a range of ±5 mm toward its inside, and a uniform opening diameter is more preferred. When a folding member with thus formed opening portion is used, the film can be stuck to a part of side face in better condition without generating wrinkle and slack. For example, the folding member 31 given in FIG. 9 has the opening diameter of the opening portion 31*a* to be uniform toward its inside. The term "toward its inside" referred to herein means "from one open edge toward the other open edge". The term "in a range of ±5 mm toward its inside" referred to herein means that the inside wall forming the opening portion forms a space in conical shape, and that the difference between the opening diameter of one open edge and the opening diameter of the other open edge is ±5 mm. The term "uniform toward its inside" referred to herein means that the inside wall forming the opening portion forms a space in cylindrical shape.

The opening diameter of the opening portion can be appropriately selected if only the protruding portion of the film can be folded toward a side face of the honeycomb structure, and at least a part of the folded protruding portion of the film can be stuck to a part of the side face of the honeycomb structure. Specifically, however, preferably the opening diameter of the opening portion has the upper limit of +5 mm, more preferably 0 mm, and most preferably −5 mm to the outer diameter of the end face of the honeycomb structure. The lower limit thereof is preferably −30 mm, more preferably −20 mm, and most preferably −15 mm. The term "to the outer diameter of the end face of the honeycomb structure" referred to herein means "the distance between the outer peripheral edge of the end face of the honeycomb structure and the open edge of the opening portion, and to the length normal to the tangent of the above-described outer peripheral edge".

The above-described opening diameter is not necessarily required to be uniform all over the outer peripheral edge. At, for example, a steeply curved section, the opening diameter can decrease from that at the linear portion to increase the adhesiveness.

The film sticking apparatus according to the present invention can be used as an apparatus for sticking a film to a honeycomb structure in a shape of cylinder, quadrangular prism, elliptical prism, or the like. Specifically, an example of the honeycomb structure in cylindrical shape is the one having the diameter of about 75 mm to about 450 mm at the end face.

The opening portion may be a hole penetrating the folding member, or a concave portion that does not penetrate the folding member. The penetration hole is, however, preferred. The penetration hole makes the folding member easily stick to the side face of the honeycomb structure. That is, the adhesiveness of the film to the side face of the honeycomb structure improves.

[1-4] Transfer Bed

The film sticking apparatus in the embodiment preferably further includes a transfer bed for transferring the honeycomb structure to a specified position. With the transfer bed, an advantage of improving the productivity is attained owing to the easy-positioning of the honeycomb structure.

As illustrated in FIG. 1, the film sticking apparatus 100 includes a honeycomb-placing section 41 to place the honeycomb structure 50 thereon, and a transfer bed 40 having a transfer conveyer 42 for moving the honeycomb-placing section 41.

Examples of the transfer conveyer include bar conveyer, belt conveyer, and walking beam.

An example of the transfer bed is turntable.

[1-5] Other Members

Other than the above-given members, the film sticking apparatus of the embodiment can be equipped with a cut-out member to cut off the film from a film roll after sticking the film to the honeycomb structure, a chucking member to chuck the film, a neutralization member to remove static electricity from the film, and the like.

An example of the cut-out member is the one having a cut-out section such as a blade, a driving section to make the cut-out section movable, and a support section for cutting out equipped with the driving section. The cut-out member may be, for example, fixed to the first support pillar 13, or may be separately positioned.

[2] Film Sticking Method

An embodiment of the film sticking method according to the present invention is a method of sticking a film to a honeycomb structure using the film sticking apparatus of the present invention. The method includes the steps of: gripping a film to hold the film in a planar state with the gripping member; positioning the honeycomb structure so that the adhesive face of the film being held in a planar state may face the one end face of the honeycomb structure; sticking the film to the one end face by pressing the adhesive face of the film against the one end face of the honeycomb structure with the pressing member; and folding a protruding portion of the film toward a side face of the honeycomb structure by inserting the honeycomb structure into the opening portion of the folding member, and simultaneously pressing at least a part of the folded protruding portion against a part of the side face of the honeycomb structure. With these steps, the film can be automatically stuck to the honeycomb structure.

The film sticking method of the embodiment, firstly performs the step of gripping a film to hold the film in a planar state with the gripping member. This step makes it possible to easily stick the film to one end face, and also to stick the film to the end face without generating wrinkle and slack.

The gripping member applied to the step can suitably adopt the gripping member similar to the above-described one. The film can suitably use the film similar to the above-described one.

Figure 3:
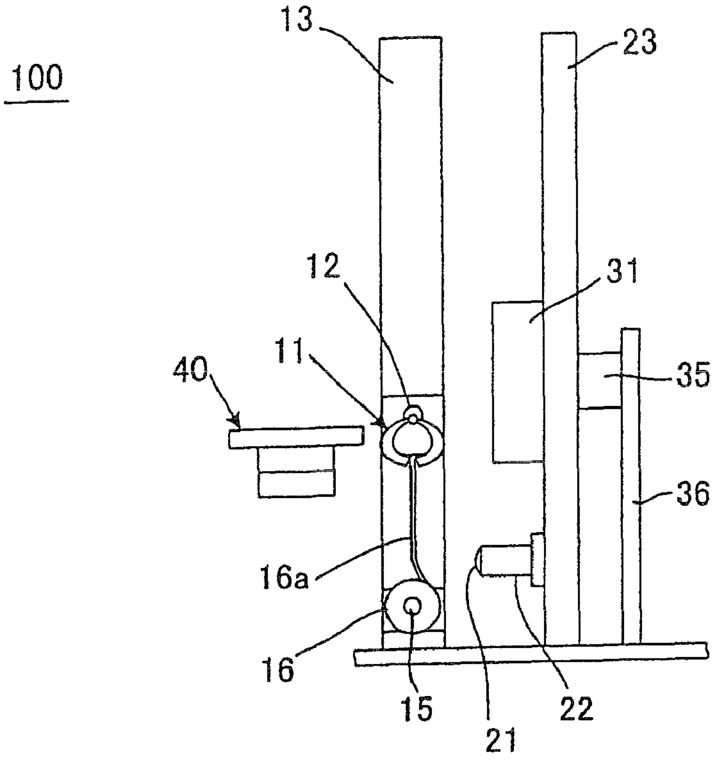
FIG. 3 illustrates a side view of the film sticking apparatus given in FIG. 1, in an operating state.

FIG. 3 illustrates a side view of the film sticking apparatus 100 given in FIG. 1, in an operating state. The figure illustrates the state after gripping the film 16*a* with the gripping member 11, and on drawing-out the film 16*a* to a specified position. Once the film 16*a* is drawn out to the specified position, the honeycomb structure 50 is placed on the honeycomb-placing section 41 of the transfer bed 40.

Figure 4:
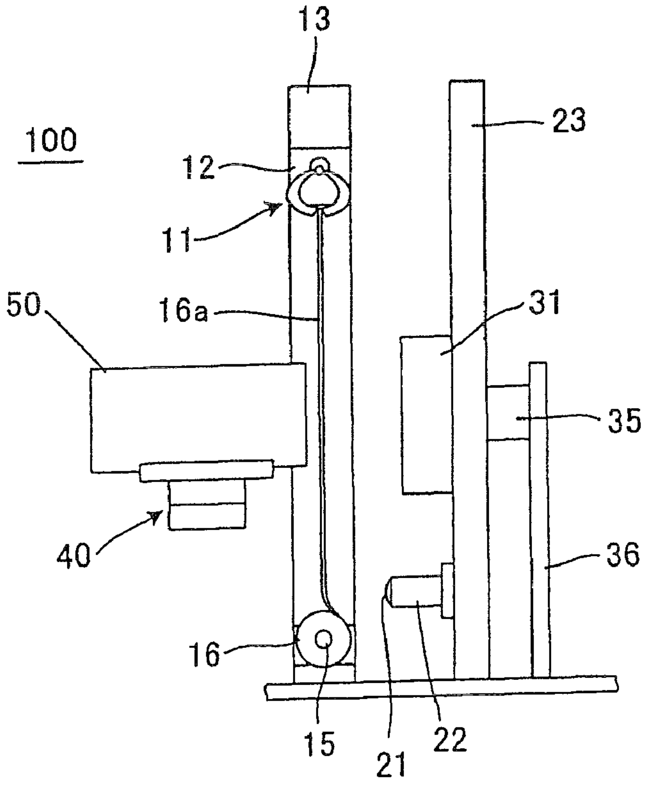
FIG. 4 illustrates a side view of the film sticking apparatus given in FIG. 1, in an operating state.

Next, the film sticking method of the embodiment performs the step of positioning the honeycomb structure so that the adhesive face of the film being held in a planar state may face the one end face of the honeycomb structure. Although the step may be carried out by hand, use of a transfer bed (for example the transfer bed 40 shown in FIG. 1) can position the honeycomb structure at a predetermined position so that the operation become easy. FIG. 4 shows the state that the transfer bed 40 positions the honeycomb structure 50 so that the adhesive face of the film 16*a* and one end face of the honeycomb structure 50 may face with each other.

Then, the method performs the step of sticking the film to one end face by pressing the adhesive face of the film against the one end face of the honeycomb structure with the pressing member. By conducting the step, the film can be stuck to one end face of the honeycomb structure without generating wrinkle and slack.

The pressing member used in the step suitably adopts the pressing member similar to the above-described one, and the member preferably has cylindrical shape rotatable around the longitudinal central axis, and is preferably positioned so that the longitudinal central axis may become orthogonal to the longitudinal central axis of the honeycomb structure. The term "orthogonal" referred to herein is not limited to the configuration where the central axis of the pressing member directly crosses orthogonally the central axis of the honeycomb structure, and includes the concept that, when projecting these central axes, both shadows cross orthogonally with each other.

FIG. 5 illustrates the state that the rotatable cylindrical pressing member 21 presses the adhesive face of the film 16*a* against one end face of the honeycomb structure 50 to stick the film 16*a* to the one end face.

The pressing member preferably presses the film against an end face of the honeycomb structure while rotating and traveling in parallel with the end face at a speed ranging from 30 to 800 mm/sec, more preferably in a range from 35 to 500 mm/sec, and most preferably from 40 to 100 mm/sec. If the travel speed of the pressing member is smaller than 30 mm/sec, the productivity may deteriorate because the film-sticking operation takes an excessively long time. If the travel speed exceeds 60 mm/sec, sufficient sticking of the film to the end face may fail.

Although the pressing member may be an independently rotatable one, a preferable one is to become rotatable by bringing the pressing member in, for example, cylindrical shape contact with the film, or the one becoming rotatable by the friction force generated between the pressing member and the film.

The number of pressings of the film against the end face by the pressing member is preferably in a range from 2 to 8, more preferably from 3 to 6, and most preferably from 4 to 5. If the number is less than 2, the film may fail to be satisfactorily stuck to the end face. If the number exceeds 8, the film-sticking operation takes an excessively long time, thus the productivity may deteriorate. The term "the number of pressings of the film against the end face by the pressing member" referred to herein mean the number of returns of the pressing member to the original position. That is, in FIG. 5, one cycle is defined as the movement of the pressing member: traveling upward while pressing the film against the end face, then traveling downward while pressing the film against the end face, thus returning to the original position before starting. The pressing strength is not specifically limited as far as the strength does not cause the partition wall of the honeycomb structure to get chipped or not induce break of the film, and as far as the film adhesiveness is assured. It is, however, preferable that the strength is 0.05 MPa or more and 1.0 MPa or less.

Figure 6:
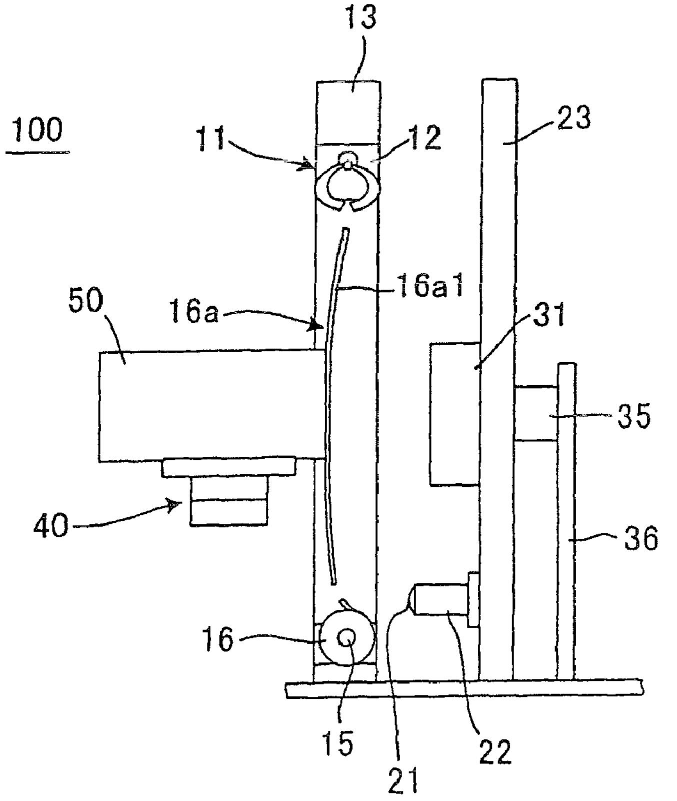
FIG. 6 illustrates a side view of the film sticking apparatus given in FIG. 1, in an operating state.

As illustrated in FIG. 6, after the film is stuck to the end face with the pressing member, the pair of claws of the gripping member 11 is opened, and the film 16*a* is cut-out from the film roll 16. For cutting out the film 16*a* from the film roll 16, above-described cut-out member or the like can be used.

Then, the method performs the step of inserting the honeycomb structure into the opening portion of the folding member to fold the protruding portion of the film toward a side face of the honeycomb structure, and simultaneously to press at least a part of the folded protruding portion against a part of the side face of the honeycomb structure. By conducting the step, the film can be stuck to the side face of the honeycomb structure in a good condition.

The folding member used in the step can suitably adopt the folding member similar to the above-described one.

When the open edge of the opening portion and the outer peripheral edge of the end face of the honeycomb structure are in the same shape or in a similar shape with each other, the ratio of the diameter of the open edge to the outer diameter of the end face of the honeycomb structure is preferably 80% at the lower limit, more preferably 85%, and most preferably 90%. The upper limit thereof is preferably 105%, more preferably 100%, and most preferably 95%. If the above ratio is less than 80%, the insertion of the honeycomb structure into the opening portion becomes difficult, and sticking the film to the side face of the honeycomb structure may fail. If the above ratio exceeds 105%, the pressing force to press the film against the side face of the honeycomb structure cannot fully be attained, thus failing in sticking the film to the side face of the honeycomb structure in some cases.

Figure 9:
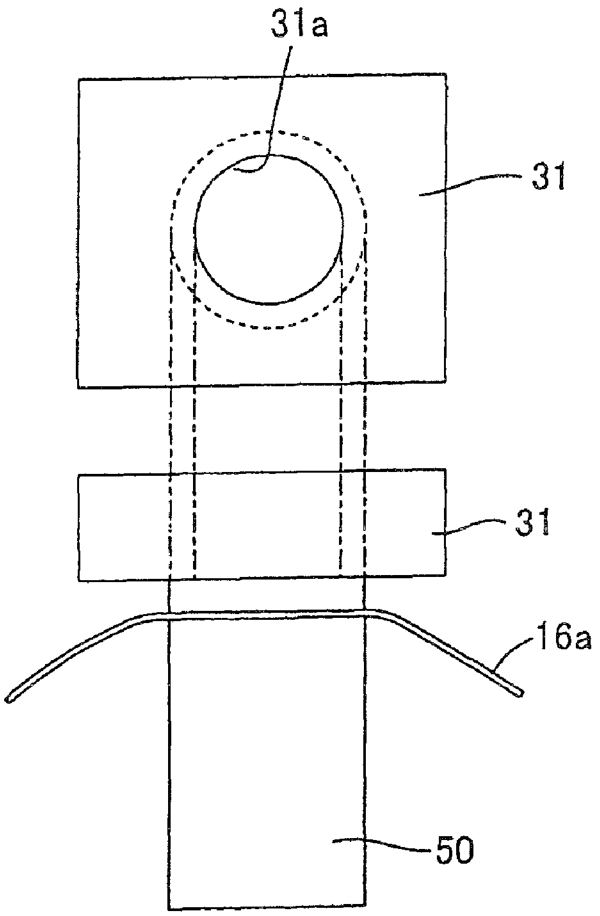
FIG. 9 is an explanatory diagram illustrating the positional relation between the honeycomb structure and a folding member.
Figure 10:
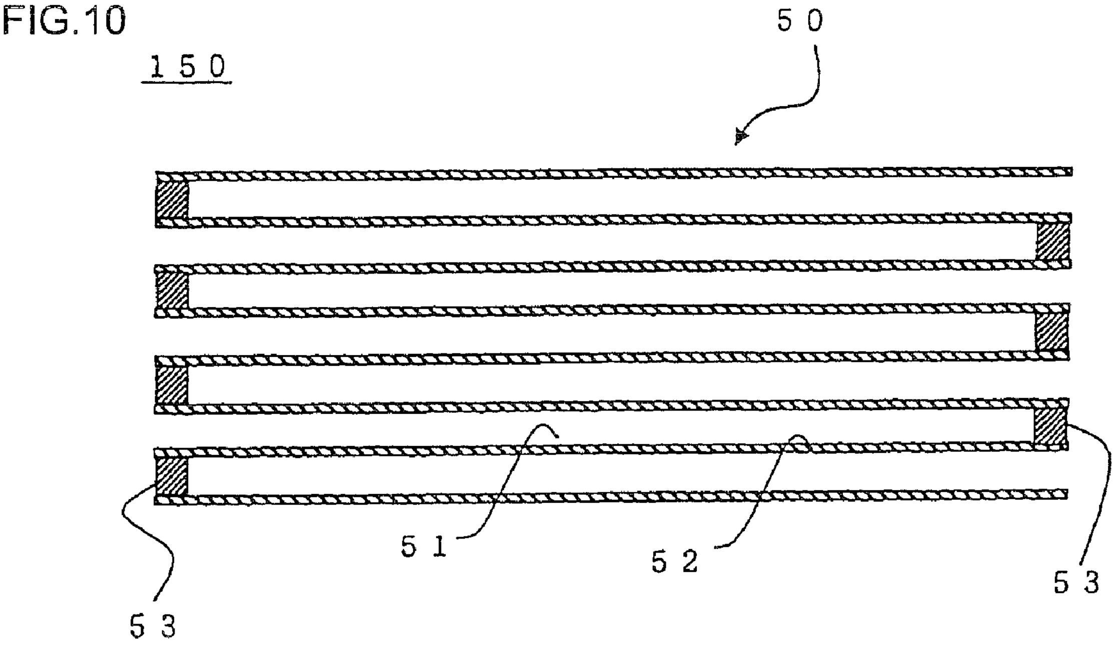
FIG. 10 is a cross sectional view of the honeycomb structure provided with the plugging sections.

When the honeycomb structure is inserted into the opening portion of the folding member, it is preferable that the honeycomb structure is positioned, relative to the folding member, so that the whole area of outer peripheral edge of the end face may contact with the face of the folding member on the side into which the honeycomb structure is inserted. With the positioning of the folding member, the film can be stuck to the side face of the honeycomb structure in good condition. FIG. 9 is an explanatory diagram illustrating the positional relation between the honeycomb structure and the folding member, showing the state that the folding member is placed so that the circle formed by the open edge of the opening portion 31*a* may become a concentric circle with the circle formed by the end edge of the end face of the honeycomb structure 50.

The insertion depth of the honeycomb structure into the folding member is preferably 5 mm or more, and more preferably 70 mm or less. If the insertion depth is less than 5 mm, some shapes of the honeycomb structure may result in insufficient sticking of the film. If the insertion depth exceeds 70 mm, the friction force between the honeycomb structure and the folding member increases to deteriorate the operability in some cases.

Figure 7:
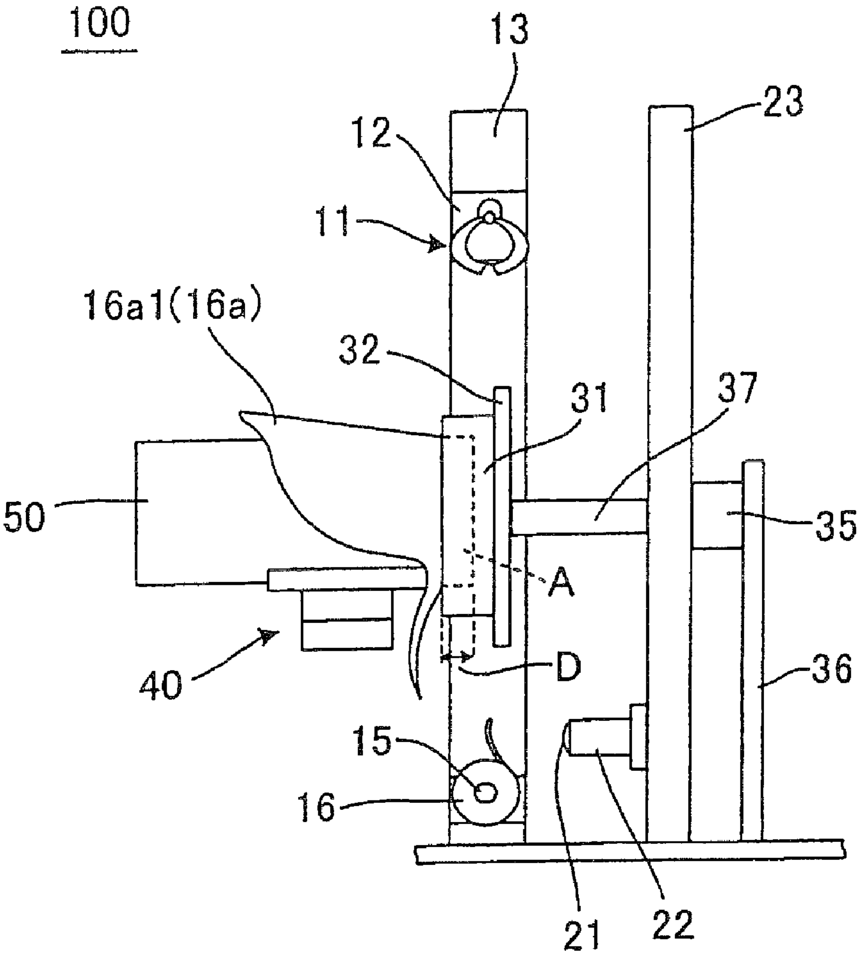
FIG. 7 illustrates a side view of the film sticking apparatus given in FIG. 1, in an operating state.

FIG. 7 shows the state that the folding member 31 folds a protruding portion 16a1 of the film 16a toward a side face of the honeycomb structure 50, and simultaneously sticks the folded protruding portion 16a1 to a part of the side face of the honeycomb structure 50. As illustrated in FIG. 7, within the step, the folding member 31 is pushed-out by the shaft 37 of the driving cylinder 35 toward the honeycomb structure 50.

Figure 8:
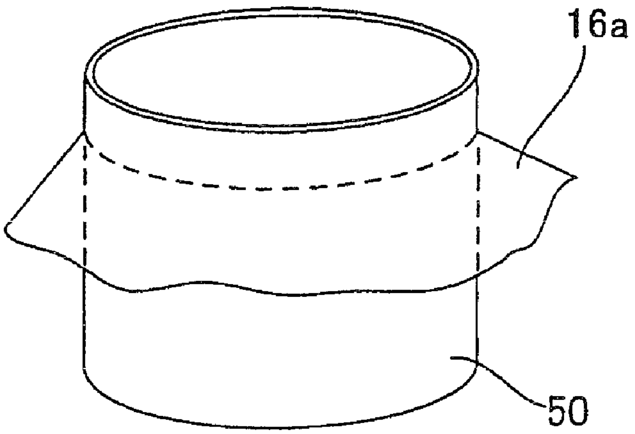
FIG. 8 is a perspective view of a honeycomb structure in a film-stuck state.

By the above-described steps, the film can be automatically stuck to the honeycomb structure. FIG. 8 is a perspective view of the honeycomb structure 50 in a state of sticking the film 16a.

EXAMPLES

The present invention will be described specifically referring to the examples. However, the present invention is not limited to these examples.

Example 1

The film sticking apparatus 100 illustrated in FIG. 1 was used to stick automatically a film (25 μm in thickness, manufactured by Sumitomo 3M Limited) to a cylindrical honeycomb structure, (150 mm in outer diameter at end face, 150 mm in length). As shown in FIG. 2, the film sticking apparatus 100 illustrated in FIG. 1 had members arranged sequentially, beginning from the transfer bed 40 side, the gripping member 11, the pressing member 21, and the folding member 31.

The gripping member 11 was the one having a pair of claws in half-cylindrical shape, giving totally approximately cylindrical shape. To the driving mechanism 12 driving the gripping member 11, the gripping member 11 was attached, and the driving mechanism 12 which can move up and down was mounted to the first support pillar 13. In addition, at a lower portion of the first support pillar 13, the support rod 15 was fixed so that the longitudinal central axis may become in parallel with the longitudinal central axis of the gripping member 11. Furthermore, at a lower portion of the first support pillar 13, a cut-out member (not shown) for cutting the film was positioned. The support rod 15 was equipped with the cylindrical film roll 16.

The pressing member 21 was in cylindrical shape, (25 mm in diameter, 150 mm in length, made of urethane resin), rotatable around the longitudinal central axis, and was positioned so that the longitudinal central axis may become in parallel with the longitudinal central axis of the gripping member 11. The pressing member 21 was supported by the lift mechanism 22. Then the lift mechanism 12 which can move up and down was mounted on the second support pillar 23.

The applied folding member 31 was the one in rectangular parallelepiped shape, (180 mm in length, 180 mm in depth, and 50 mm in height), made of urethane resin (hardness 40), having a uniform penetration hole (opening portion) 31a with 145 mm of opening diameter. The folding member 31 was fixed to the fixing plate 32 having the penetration hole with opening diameter of 145 mm so that the penetration hole of the folding member 31 and the penetration hole of the fixing plate 32 may align with each other, and then the fixing plate 32 was fixed to the cylinder 37 of the driving cylinder 35. After that, the cylinder 35 was fixed to the third support pillar 36.

The transfer bed 40 was the one in which the honeycomb-placing section 41 on which the honeycomb structure 50 can be placed was fixed to the transfer conveyer 42 that allows the honeycomb-placing section 41 to travel.

On pressing the film against the end face, the pressing member 21 traveled from lower side to upper side of the end face at a speed of 50 mm/sec.

According to the film sticking apparatus of Example 1, it was confirmed that the film 16a was automatically stuck to the honeycomb structure 50 without generating wrinkle and slack. The film 16a on the side face was stuck to an area beginning from the end face of the honeycomb structure 50 to the position of 100 mm distant from the end face thereof.

The film stuck to the side face of the honeycomb structure was observed, and evaluation was given in accordance with the criteria described below, (given at the column "Film-sticking condition on the side face" in Table 1). The honeycomb structure was pushed into the folding member by a predetermined depth of D, (actually 10 mm, given by the symbol D in FIG. 7). To the side face A (given by the symbol A in FIG. 7) of the honeycomb structure corresponding to the pushed-in depth (predetermined depth of D), the area of film-sticking portion was determined. When the film-sticking area was more than 90% to the total area of the side face A, the evaluation was given as "◎". When the film-sticking area was more than 70% and not more than 90%, the evaluation was given as "○". When the film-sticking area was more than 50% and not more than 70%, the evaluation was given as "Δ". When the stuck film was broken, or if the honeycomb structure was not able to be inserted into the folding member, or when the film-sticking area was more than 0% (film was not able to be stuck to the side face A) and not more than 50%, the evaluation was given as "X".

The film sticking apparatus of Example 1 gave the evaluation of "◎" in terms of the film-sticking condition on the side face. The evaluation result is given in Table 1. In Table 1, the term "hardness" means the hardness of the folding member, the term "material" means the material of the folding member, and the term "opening diameter" means the opening diameter of the folding member. In the opening diameter column, "−5 mm" means −5 mm to the outer diameter at the end face of the honeycomb structure (150 mm, given as the "outer diameter of honeycomb structure" in Table 1) or indicating that the opening diameter was 145 mm. The term "urethane" means the "urethane resin", the term "silicon" means the "silicon resin", and the term "polyethylene" means the "polyethylene resin".

TABLE 1

| | Hardness | Material | Outer diameter of honeycomb structure (mm) | Opening diameter | Film-sticking condition on side face |
|---|---|---|---|---|---|
| Example 1 | 40 | Urethane | 150 | −5 mm | ◎ |
| Comparative example 1 | 7 | Urethane | 150 | −5 mm | X (Unable to stick) |
| Comparative example 2 | 65 | Urethane | 150 | −5 mm | X (Broken) |
| Example 2 | 55 | Urethane | 150 | −5 mm | ◎ |
| Example 3 | 40 | Silicon | 150 | −5 mm | ◎ |
| Example 4 | 40 | Polyethylene | 150 | −5 mm | ◎ |
| Example 5 | 40 | Urethane | 150 | −12 mm | ◎ |
| Example 6 | 40 | Urethane | 150 | −0 mm | ○ |
| Comparative example 3 | 40 | Urethane | 150 | +8 mm | X (Unable to stick) |
| Comparative example 4 | 40 | Urethane | 150 | −28 mm | Δ |
| Comparative | 40 | Urethane | 150 | −33 mm | X (Unable to |

TABLE 1-continued

| | Hardness | Material | Outer diameter of honeycomb structure (mm) | Opening diameter | Film-sticking condition on side face |
|---|---|---|---|---|---|
| example 5 | | | | | insert) |

Examples 2 to 6 and Comparative Examples 1 to 5

As given in Table 1, a film sticking apparatus was fabricated in a similar procedure to that of Example 1 except that the hardness, the material, and the opening diameter of the folding member were changed. Thus fabricated film sticking apparatus was applied to stick a film (25 μm in thickness, manufactured by Sumitomo 3M Limited) to a honeycomb structure (cylindrical shape, 150 mm in outer diameter, 150 mm in length). For each of Examples and Comparative Examples, the film stuck to the side face of the honeycomb structure was observed, and the above-described evaluation was given. The evaluation results are given in Table 1.

As clearly shown in Table 1, the film sticking apparatuses of Examples 1 to 6 were confirmed to be able to automatically stick the film to end face and side face of the honeycomb structure without generating wrinkle and slack compared with the film sticking apparatus of Comparative Examples.

INDUSTRIAL APPLICABILITY

When manufacturing a plugged honeycomb structure used as a filter to collect particulates existing in large amounts in exhaust gas discharged from internal combustion engine such as diesel engine, the film sticking apparatus according to the present invention is suitable for the apparatus that can automatically stick a film to an end face of the honeycomb structure.

When manufacturing a plugged honeycomb structure used as a filter to collect particulates existing in large amounts in exhaust gas discharged from internal combustion engine such as diesel engine, the film sticking method according to the present invention can be adopted as a method that can automatically stick a film to an end face of the honeycomb structure.

DESCRIPTION OF THE REFERENCE SYMBOLS

100: Film sticking apparatus
11: Gripping member
12: Driving mechanism
13: First support pillar
15: Support rod
16: Film roll
16*a*: Film
21: Pressing member
22: Lift mechanism
23: Second support pillar
31: Folding member
31*a*: Opening portion
32: Fixing place
35: Driving cylinder
36: Third support pillar
37: Shaft
40: Transfer bed
41: Honeycomb-placing section
42: Transfer conveyer
50: Honeycomb structure
51: Cell
52: Partition wall
53: Plugging section
150: Plugged honeycomb structure

What is claimed is:

1. A film sticking method for sticking a film to a honeycomb structure using the film sticking apparatus, comprising:

a gripping member gripping a film having an adhesive face to hold the film in a planar state;

a pressing member pressing said adhesive face of said film being held in a planar state against one end face of a cylindrical honeycomb structure having a plurality of cells formed that communicate between two end faces thereof, and thus sticking said film to said one end face; and a folding member having an opening portion formed that allows an end of said honeycomb structure on the side to which said film is stuck to be inserted, a hardness of the folding member having 10 degrees at the lower limit and 60 degrees at the upper limit, wherein said folding member folds a protruding portion of said film protruding from said one end face of said honeycomb structure by inserting said honeycomb structure into said opening portion, toward a side face of said honeycomb structure, and simultaneously presses at least a part of said folded protruding portion against a part of the side face of said honeycomb structure to stick said film to said side face; the method comprising the steps of:

gripping a film to hold the film in a planar state with said gripping member;

positioning said honeycomb structure so that said adhesive face of said film being held in a planar state may face said one end face of said honeycomb structure;

sticking said film to said one end face by pressing said adhesive face of said film against said one end face of said honeycomb structure with said pressing member; and folding a protruding portion of said film toward a side face of said honeycomb structure by inserting said honeycomb structure into said opening portion of said folding member, and simultaneously pressing at least a part of said folded protruding portion against a part of said side face of said honeycomb structure.

2. The film sticking method according to claim 1, wherein an open edge of said opening portion and an outer peripheral edge of the end face of said honeycomb structure are in the same shape or in a similar shape with each other, and the ratio of the diameter of said open edge to the outer diameter of the end face of said honeycomb structure is 80% at the lower limit and 105% at the upper limit.

3. The film sticking method according to claim 1, wherein, when said honeycomb structure is inserted into said opening portion of said folding member, said honeycomb structure is positioned, relative to said folding member, so that the whole area of outer peripheral edge of said end face may contact with the face of said folding member on the side into which said honeycomb structure is inserted.

4. The film sticking method according to claim 2, wherein, when said honeycomb structure is inserted into said opening portion of said folding member, said honeycomb structure is positioned, relative to said folding member, so that the whole area of outer peripheral edge of said end face may contact with the face of said folding member on the side into which said honeycomb structure is inserted.

5. The film sticking method according to claim 1, wherein said pressing member is in a cylindrical shape rotatable around the central axis in the longitudinal direction thereof, and is positioned so that said central axis in the longitudinal direction may become orthogonal to the central axis in the longitudinal direction of said honeycomb structure, and wherein said pressing member travels in parallel with said end face at a speed ranging from 30 to 800 mm/sec while rotating, thus pressing said film against said end face with the outer peripheral face of said pressing member.

6. The film sticking method according to claim 2, wherein said pressing member is in a cylindrical shape rotatable around the central axis in the longitudinal direction thereof, and is positioned so that said central axis in the longitudinal direction may become orthogonal to the central axis in the longitudinal direction of said honeycomb structure, and wherein said pressing member travels in parallel with said end face at a speed ranging from 30 to 800 mm/sec while rotating, thus pressing said film against said end face with the outer peripheral face of said pressing member.

7. The film sticking method according to claim 3, wherein said pressing member is in a cylindrical shape rotatable around the central axis in the longitudinal direction thereof, and is positioned so that said central axis in the longitudinal direction may become orthogonal to the central axis in the longitudinal direction of said honeycomb structure, and wherein said pressing member travels in parallel with said end face at a speed ranging from 30 to 800 mm/sec while rotating, thus pressing said film against said end face with the outer peripheral face of said pressing member.

8. The film sticking method according to claim 4, wherein said pressing member is in a cylindrical shape rotatable around the central axis in the longitudinal direction thereof, and is positioned so that said central axis in the longitudinal direction may become orthogonal to the central axis in the longitudinal direction of said honeycomb structure, and wherein said pressing member travels in parallel with said end face at a speed ranging from 30 to 800 mm/sec while rotating, thus pressing said film against said end face with the outer peripheral face of said pressing member.

* * * * *